(No Model.)

W. L. CHENEY.
LATHE TOOL AND SUPPORT.

No. 491,256. Patented Feb. 7, 1893.

Walter Lee Cheney
INVENTOR

BY Geo. L. Cooper
ATTORNEY

WITNESSES.
Ella H. Cooper
Gertrude Borst

UNITED STATES PATENT OFFICE.

WALTER LEE CHENEY, OF MERIDEN, CONNECTICUT, ASSIGNOR TO THE MERIDEN MACHINE TOOL COMPANY, OF SAME PLACE.

LATHE-TOOL AND SUPPORT.

SPECIFICATION forming part of Letters Patent No. 491,256, dated February 7, 1893.

Application filed January 29, 1892. Serial No. 419,716. (No model.)

*To all whom it may concern:*

Be it known that I, WALTER LEE CHENEY, a citizen of the United States, residing at Meriden, New Haven county, Connecticut, have invented a new and useful Improvement in Forming-Lathe Tools and Supports Therefor, of which the following is a specification.

My invention relates chiefly to tools and supports used in that class of lathes adapted to form cast metal or other articles by means of a tool or cutter having its working face grooved or shaped to correspond to the longitudinal section of the article to be produced.

It consists of means whereby a plurality of cuts may be given to the article to be formed or turned during a single movement of the cross-slide on which the cutter is mounted.

Figure 1:
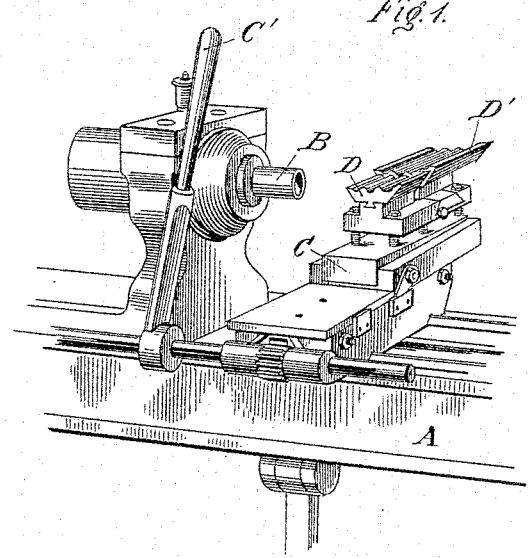
Figure 2:
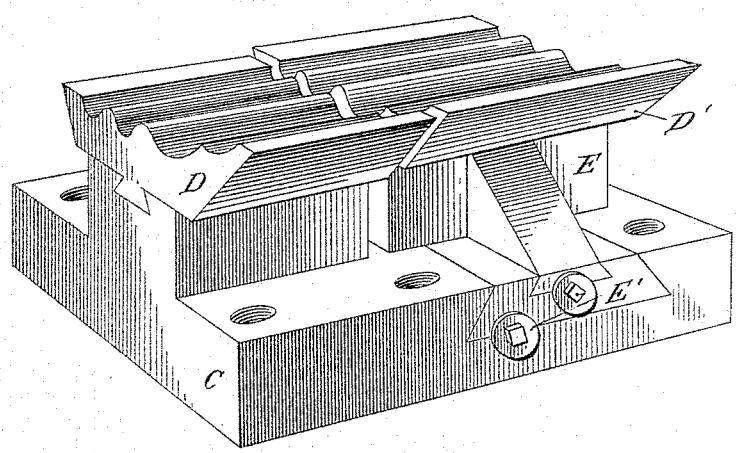

In the accompanying drawings Figure 1 represents in perspective so much of a forming lathe as is necessary to show my invention; Fig. 2 represents the cross-slide and cutters detached from the lathe and shows a modification.

The same letters refer to like parts in both views.

A designates a lathe bed; B, a head stock; B', a live spindle; C, a cross-slide; C', an actuating lever; c, a carriage on which the cross-slide C is mounted. D, a tool or cutter; D', a second tool or cutter; E, Fig. 2, a subsidiary slide transverse to the cross-slide C; E', means for actuating the slide E.

In the example of my invention shown in the drawings the bed A, head stock B, spindle B', cross-slide C actuating lever C' and carriage c are of ordinary or convenient construction. The lever C' may of course be replaced by the well known screw and hand wheel if desired.

The tools or cutters D and D' may advantageously be made by first shaping, as by planing or otherwise, an integral piece of metal so that in cross section its upper surface shows a series of elevations and depressions corresponding to the configuration of the longitudinal section of the article to be formed or turned, next cutting such shaped tool into two or more parts either transversely or obliquely, then grinding the similar ends of said parts to a proper cutting angle.

The cross-slide C is provided with seats in a line with each other transverse to the axis of the lathe, such seats being adapted to sustain the tools or cutters D and D', as shown in Fig. 1 of the drawings, and with means, as screws or bolts, for securing the tools D and D' in place. As shown the forward or cutting edges of the cutters D and D' are preferably slightly raised so as to give the proper clearance to the article to be formed. The forward or cutting edge of the rear tool or cutter D' is raised somewhat above that of the cutter D. Preferably means, which may be screws or quoins, are provided for increasing or diminishing the difference of elevation between the cutting edges of the cutters D and D'. As means for similar purposes are well known in the art and as the means specifically form no part of my present invention I have not thought it necessary to describe them at length.

The operation of my device will be readily understood from an examination of the drawings. It will be seen that when the cross-slide C is drawn forward the cutter D first comes in contact with the article to be formed, which for example may be a rough metal casting, and takes from it a chip of the desired thickness. The rear cutter D', being so adjusted that its cutting edge is very slightly above that of the cutter D, then takes off a very light chip and leaves the finished article with a smooth surface quite free from the "chatter" marks which are often left on the article after taking the first or "roughing cut."

It is found in practice that small articles made from the ordinary soft alloys may in this way be so smoothly finished as to be ready for plating or lacquering without any intervening polishing or buffing, a highly finished and thoroughly merchantable surface being produced. In some cases, *e. g.* where a flattened hemispherical end is to be finished on the article to be formed, it is advantageous to be able to adjust the rear cutter D' transversely of the slide C instead of or as well as vertically.

In Fig. 2 of the drawings is shown a subsidiary slide E mounted upon and transverse to the cross-slide C and provided with means as a screw E' for adjusting and securing it in place. Upon this slide E the rear cutter D' is mounted. It is obvious that the operation of this modified form of my device will be similar to that of the form first described.

In practice it will often be found advantageous to make the original cutter bar of considerable length and to cut it into three or more pieces two of which are used as the cutters D and D' respectively and the others reserved to take the place of the forward cutter D, which as it comes in contact with the possibly sandy or chilled surface of the rough casting or the like and as it takes a relatively deep cut requires much more frequent grinding than the rear cutter D'.

It will often be found advantageous, especially where the harder alloys as brass or bronze are being formed, that the cutting edges of the tools D and D' should be oblique rather than at right angles to their length. In this case only a small part of the cutting edge engages with the work at any time and a special chip is taken off as in the ordinary screw feed engine lathe. As this forms no part of my invention I have not deemed it necessary to illustrate it.

It is obvious that it is non essential to my invention in its broadest form that the cutters D and D' should be made as before described, i. e. from a previously shaped integral bar or piece of metal. In turning or forming certain forms, e. g. a spherical or spheroidal one, it might be better to make the cross-section of the rear cutter D' similar to but smaller than that of the forward cutter D.

It is clear that other mechanical changes besides those specified may be made without departing from my invention.

What I claim and desire to secure by Letters Patent of the United States is as follows:

In a forming lathe the combination of a transverse slide, a tool or cutter mounted on said slide, a subsidiary slide, mounted on said first named slide and adjustable thereon and a tool or cutter mounted on said subsidiary slide, substantially as described.

WALTER LEE CHENEY.

Witnesses:
GEO. L. COOPER,
GEO. M. CHITTENDEN.